United States Patent
Kanai

[19]

[11] Patent Number: 5,912,891
[45] Date of Patent: Jun. 15, 1999

[54] VIRTUAL NETWORK SYSTEM

[75] Inventor: Hiroshi Kanai, Atsugi, Japan

[73] Assignee: Hitachi, Ltd., Tokyo, Japan

[21] Appl. No.: 08/808,441

[22] Filed: Feb. 28, 1997

[30] Foreign Application Priority Data

Feb. 28, 1996 [JP] Japan ..................................... 8-041071

[51] Int. Cl.[6] ....................................................... H04J 3/16
[52] U.S. Cl. ............................................ 370/395; 370/465
[58] Field of Search .................................... 370/395, 401,
370/389, 397, 465, 466, 469, 471, 474, 476

[56] References Cited

U.S. PATENT DOCUMENTS 5,581,552 12/1996 Caranlaz et al. ......................... 370/396

*Primary Examiner*—Dang Ton
*Attorney, Agent, or Firm*—Fay, Sharpe, Beall, Fagan, Minnich & McKee

[57] ABSTRACT

Data communication is achieved between different LAN segments without passing the data through a router. A cell segmentation selector selects either LAN emulation or native-mode ATM for a packet made at an upper level protocol higher than a network layer. A LAN emulator makes an ATM cell from the MAC frame after the packet is made with a MAC frame. The native-mode ATM unit directly makes the ATM cell from the packet. Either the LAN emulation or the native-mode ATM is selected for operation by the cell segmentation selector. Then, the ATM cell is made by the LAN emulator or the native-mode ATM unit with reference to the selection and then the data communication is carried out using the produced ATM cell.

17 Claims, 4 Drawing Sheets

VIRTUAL NETWORK SYSTEM

BACKGROUND OF THE INVENTION

1. Field of the Invention

This invention relates to a virtual network system in which data communication is carried out among a plurality of work stations connected to LAN segments, and more particularly to a virtual network system for performing efficient data communication between a plurality of work stations by emulating existing LAN on an ATM network.

2. Description of the Related Art

In the prior art, systems are known that have a plurality of computers connected together with a communication cable to construct a LAN (Local Area Network) or to connect a plurality of LANs having the aforesaid plurality of computers connected thereto through a communication line to construct a WAN (Wide Area Network). For the LAN and WAN systems, data communication is provided for transmitting or receiving data between the computers connected thereto.

As one example of the aforesaid prior art network, there is provided a network for performing data communication by connecting a plurality of computers with a communication cable known as Ethernet and for transmitting or receiving a MAC (Media Access Control) frame on the Ethernet.

Data is transmitted from a computer of a transmitting side to another computer of a receiving side using a communication protocol such as TCP/IP (Transmission Control Protocol/Internet Protocol) in the prior art Ethernet network. For example, at first, the transmitting side computer adds information such as the IP (Internet Protocol) address to make an IP packet. The IP address is a network address for recognizing the receiving side computer for the data being sent over the Ethernet. Then, the transmitting side computer connected to the Ethernet performs an address resolution for getting a MAC address of the receiving side computer from the IP address of the receiving side computer in accordance with another protocol, such as ARP (Address Resolution Protocol). Thereafter, the transmitting side computer adds information such as the aforesaid attained MAC address of the receiving side computer to the IP packet to make a MAC frame and then transmits the MAC frame onto the network.

Each computer connected to the prior art network using the Ethernet receives the MAC frame transmitted as described above, and determines whether or not it is the computer specified by the transmitted MAC address. In the case that the MAC address specified as the destination address is coincident with the MAC address of a particular computer, the computer reads out the IP packet within the MAC frame. In the case that the MAC address of the specified destination does not coincide with the MAC address of the computer, the computer discards the MAC frame. Thus, data communication between the transmitting side computer and the receiving side computer is performed.

The IP address used in the prior art Ethernet network is an address defined for the network layer (the third layer) of a 7-layer model of OSI (Open Systems Interconnection). The IP address is stored in a storage device of the computer by software executed when the computer starts to operate. Software, which uses the communication protocol such as TCP/IP or the like, uses the IP address to recognize each of the plurality of the computers connected to the network. The IP address is used when the computer is recognized on the network with the software used by the and further which can be changed into an optional value in response to a content of the software executed when the computer starts to operate.

In addition, the MAC address is an address defined for a data link layer (the second layer) of the OSI 7-layer model. The MAC address is a hardware address specific to a respective network interface card/chip or the like, and is assigned to the network interface card/chip which connects the computer to the network. The MAC address can not be changed.

In the prior art network using the Ethernet, the Ethernet acting as the communication medium is shared by a plurality of computers and one IP packet transmitted onto the Ethernet can be received by a plurality of computers, thereby either a broadcast or a multi-cast communication to the plurality of computers can be easily performed.

As another example of a prior art network, there is provided a network using ATM (Asynchronous Transfer Mode) and the network using the aforesaid ATM is already described in a publication such as "ATM-LAN" edited by Hiroshi Shimizu and Hiroshi Suzuki, Soft Research Center. In the ATM network, a plurality of computers are connected to an ATM switch and an an ATM cell of 53 bytes is transmitted/received through the ATM switch to perform the data communication.

In the case that the specific data is transmitted from the transmitting side computer to the receiving side computer in accordance with the communication protocols such as TCP/IP in the ATM network, for example, at first, the transmitting side computer adds information such as an IP address for making the receiving side computer recognize the transmitted data.

Then, the transmitting side computer performs an address resolution for getting the ATM address of the receiving side computer from the ATM address resolution server having an address administration table, which administrates the ATM addresses corresponding to the IP addresses of a plurality of computers connected to the ATM network. After getting the ATM address of the receiving side computer from the ATM address resolution server, the transmitting side computer constructs a connection with the receiving side computer by using the ATM address of the receiving side computer. After establishing a connection with the receiving side computer, the transmitting side computer constructs makes an ATM cell from the IP packet and transmits the produced ATM cell to the receiving side computer.

The receiving side computer, which the transmitting side computer has established a connection with, receives a plurality of ATM cells sent from the transmitting side computer and assembles the IP packet from the plurality of received ATM cells. Thus, data communication between the transmitting side computer and the receiving side computer is performed.

In the aforesaid ATM network, ATM cells may be made from a packet using an upper level protocol higher than or equal to the network layer of the existing network, which is transmitted and received on the ATM network and assembled into the packet. This manner for transmitting and receiving packets of an upper level protocol higher than or equal to the network layer is known as native-mode ATM. In the case that the packet is an IP packet, this is known as IP-over-ATM.

It is well known that the ATM network has superior functions such as setting a scalable transmitting speed or communication quality for every receiver as compared with the prior art network using the aforesaid Ethernet. However, a so called face-to-face communication after establishing the connection in the aforesaid ATM network is fundamental to its operation, so that broadcast or multi-cast communication may not be performed without applying special techniques.

In the case that the aforesaid ATM network is introduced to a new or existing network system, there are a lot of needs to operate the network system with an ATM network connected to the existing Ethernet, or to run the existing application software, which is made under an assumption of using the Ethernet, on the computer connected to the ATM network, because the network system using the aforesaid Ethernet and the like has already been distributed broadly.

As described above, in the case that the ATM network is connected to an existing LAN network or the existing application software operates on a computer connected to the ATM network, a LAN emulation for emulating the MAC protocol using the existing network to transmit/receive the MAC frame is carried out on the ATM network.

For example, in the case that the transmitting side computer transmits the specified data to the receiving side computer through the application software using the existing Ethernet in the ATM network, at first, the transmitting side computer adds information such as an IP address or the like for the receiving side computer to the aforesaid specific data to make the IP packet, thereafter adds information such as the MAC address of the receiving side computer to the aforesaid IP packet to make the MAC frame.

Then, the transmitting side computer inquires of the LAN emulation server the ATM address corresponding to the MAC address of the receiving side computer. The LAN emulation server, having an address administration table where the ATM addresses correspond to the MAC addresses of a plurality of computers connected to the network are registered, replies to the inquiry. Thus, the transmitting side computer performs an address resolution for getting the ATM address of the receiving side computer.

The transmitting side computer, which obtains the ATM address of the receiving side computer from the LAN emulation server, establishes a connection with the receiving side computer by using the ATM address of the receiving side computer, and makes ATM cells from the MAC frame and transmits them to the receiving side computer. The receiving side computer, having established a connection with the transmitting side computer, receives a plurality of ATM cells sent from the transmitting side computer, constructs the MAC frame from the plurality of received ATM cells, and thereafter reads out the IP packet from the constructed MAC frame. Thus, a data communication between the transmitting side computer and the receiving side computer is performed.

The LAN emulation is carried out on the ATM network as described above to enable the data communication using the ATM network without changing either the network interface card or the application software of the computer connected to the existing network.

In addition, since a BUS (Broadcast and Unknown Server) for performing either the broadcasting or a multi-casting is used in the ATM network for performing the LAN emulation, it is possible to perform either the broadcasting or the multi-casting on the ATM network in an easy manner.

In the case that a plurality of emulated LANs are set by grouping a plurality of computers performing the LAN emulation into a plurality of groups in the ATM network to construct a virtual LAN, ATM routers, each of which is a router having an ATM interface are used to connect the plurality of emulated LANs each other, therein so as to perform forwarding between the aforesaid plurality of emulated LANs.

The aforesaid ATM router receives a plurality of ATM cells sent from the computer within the specified emulated LAN to construct the MAC frame, thereafter reads out the IP address of the receiver (receiving side computer) stored in the IP packet within the constructed MAC frame and transmits the plurality of received ATM cells to the receiving side computer on the emulated LAN in the case that the read-out IP address of the receiver is the IP address of the computer connected to another emulated LAN.

In addition, in the case that the IP address read-out from the IP packet in the constructed MAC frame is not the IP address of the computer connected to another emulated LAN, the ATM router does not transmit the received ATM cells to the computer on another emulated LAN.

As described above, a plurality of emulated LANs are connected through the ATM router in the prior art ATM network, thereby an IP packet is relayed from an emulated LAN to another emulated LAN and at the same time IP packets caused by a broadcast or multi-cast communication within one emulated LAN is kept from being sent to any other emulated LANs.

SUMMARY OF THE INVENTION

As a result of studying the prior art, the present inventors have found the following problems.

When the native-mode ATM is carried out in the prior art ATM network, it is necessary to prepare a new means for performing either the broadcasting or the multi-casting. On the other hand, when the LAN emulation is being carried out in the prior art ATM network, data communication specifying service quality cannot be performed even between computers having the function for performing the native-mode ATM due to the absence of a field to specify the service quality in the MAC frame.

Further, in the case that the native-mode ATM and the LAN emulation are optionally changed over to perform a data communication in the prior art ATM network, it is necessary to stop usage of the network temporarily due to the necessity for the following changes of settings. At first, a setting of the device driver in a plurality of computers performing the changing-over operation is changed to a setting of either the native-mode ATM or the LAN emulation, and thereafter the setting of the network is changed by resetting the plurality of computers and loading the changed device driver into the computer.

In addition, in the case that data communication is carried out between a plurality of emulated LANs through the ATM router in the prior art ATM network, a certain delay occurs when the ATM cell is fed out of the ATM router, due to the fact that a plurality of ATM cells are first stored in the ATM router to construct the MAC frame, thereafter the IP address of the receiver stored in the IP packet within the constructed MAC frame is read out to determine the receiver of the stored ATM cells.

It is an object of the present invention to provide technology capable of performing either the LAN emulation or the native-mode ATM in response to an operation of the application software performing the data communication.

It is another object of the present invention to provide technology capable of performing efficient data communication between different LAN segments in a virtual network system.

A summary of a typical embodiment of the invention disclosed in this patent application will be described in brief as follows.

(1) A virtual network system is provided in which a plurality of clients (client stations or work stations, such as computers, e.g personal computers) performing data communication are connected to an ATM network so as to perform both LAN emulation and native-mode ATM. In this network, there are provided cell segmentation selecting means for selecting either the LAN emulation or the native-mode ATM is to be carried out for a packet made by an upper level protocol higher than a network layer; a LAN emulation means for making ATM cells from a MAC frame after the MAC frame is made from a packet; and a native-mode ATM means for directly making ATM cells from the packet, either the LAN emulation or the native-mode ATM is selected for operation by the cell segmentation selecting means, the ATM cells are made by either the LAN emulation means or the native-mode ATM means in reference to the selected result and then the data communication is carried out by transmitting the produced ATM cells.

The cell segmentation selecting means in the virtual network system may select operation of either the LAN emulation or the native-mode ATM for the packet, when the packet made by the upper level protocol higher than the network layer of OSI 7-layer model is delivered.

In this case, the cell segmentation selecting means refers to the address of the receiver stored in the and selects either one of the LAN emulation or the native-mode ATM in reference to the referred address of the receiver.

For example, the cell segmentation selecting means may be set to operate such that the cell segmentation selecting means compares a sub-net address of the receiver stored in the packet with a sub-net address of the transmitter (transmitting side computer) and selects either the LAN emulation or native-mode ATM in reference to the result of the comparison. Alternatively, the cell segmentation selecting means may be set to operate such that the table storing the address of the transmitter in the packet is made in advance, and the cell segmentation selecting means selects either the LAN emulation or native-mode ATM on the basis of whether the address of the receiver is registered in the table or not.

Alternatively, the cell segmentation selecting means may select either one of the LAN emulation or the native-mode ATM in reference to a value of a mode selection flag set by the application software performing the data communication.

Then, in the virtual network system, either the LAN emulation means or the native-mode ATM means selected by the cell segmentation selecting means makes ATM cells, and the data communication is performed by using the produced ATM cells.

In the case that an IP packet is transmitted by executing the application software using TCP/IP in the virtual network system, for example, the cell segmentation selecting means may select for the IP packet either one of the LAN emulation carried out by the LAN emulation means or the IP-over-ATM carried out by the IP-over-ATM means, which is the native-mode ATM means in the case of the IP packet.

In the case that the LAN emulation is carried out by the LAN emulation means, the LAN emulation means adds information such as the MAC address used in the data link layer to the IP packet to make the MAC frame, thereafter by a LAN emulation server, resolves the ATM address of the receiver from the MAC address of the receiver to make the ATM cell from the MAC frame, and performs the data communication through an ATM network interface.

In the case that IP-over-ATM is carried out by the IP-over-ATM means, the IP over ATM resolves the ATM address of the receiver from the IP address of the receiver in the IP packet by an ATM address resolution server, makes ATM cells directly from the IP packet without making the MAC frame, and performs the data communication through the ATM network interface.

As described above, in the virtual network system of the present invention provides, there are provided the LAN emulation means and the native-mode ATM means, and either one of the LAN emulation or the native-mode ATM selected by the cell segmentation selecting means is carried out, so that the LAN emulation can be utilized in the case that a multiple address communication such as the broadcasting or the multi-casting or the like is necessary, and the native-mode ATM can be utilized in the case that the communication specifying service quality is carried out, without resetting the computer connected to the network.

As described above, in accordance with the aforesaid virtual network system, either the LAN emulation means or the native-mode ATM means is selected by the cell segmentation selecting means to make the ATM cell, so that it is possible to perform either the LAN emulation or the native-mode ATM in response to the operation of the application software performing the data communication.

(2) A virtual network system described in the aforesaid (1) is constructed such that there is provided an ATM address resolution server storing the ATM address corresponding to the address used in the high level protocol higher than the network layers of a plurality of clients connected to a plurality of LAN segments, and in the case that the receiver specified in the packet is present in the LAN segment differing from that of the transmitter, the ATM address of the receiver is resolved by the ATM address resolution server.

The cell segmentation selecting means of the virtual network system checks the receiver address set in the packet when the packet made by the upper level protocol higher than the network layer of OSI 7-layer model is delivered and then resolves the ATM address of the client on the different LAN segment by the ATM address resolution server in the case that the receiver is present in the LAN segment differing from that of the transmitter.

In the case that the application software using TCP/IP is executed to transmit an IP packet, the cell segmentation selecting means checks the sub-net address of the transmitter and the sub-net address of the receiver in reference to the IP address of the transmitter and the IP address of the receiver in the IP packet, and judges whether or not the transmitter and the receiver belong to the same LAN segment.

In this case, the cell segmentation selecting means may be operated such that the table storing all IP addresses of clients belonging in the same LAN segment is made in advance and the cell segmentation selecting means may judge whether or not the transmitter and the receiver belong to the same LAN segment in reference to the aforesaid table.

In the case that the transmitter and the receiver specified in the IP packet do not belong to the same LAN segment as a result of judgment of the cell segmentation selecting means, the address resolution is carried out by the ATM address resolution server to get the ATM address of the receiver from the IP address of the receiver.

Although the ATM address resolution server in the prior art ATM network is provided only with an address administration table indicating a correspondence between the IP address and the ATM address of the client in the single LAN segment, the ATM address resolution server in the virtual network system of the present invention is provided with an ARS (address resolution server) address administration table indicating a correspondence between the IP address and the ATM address of the client in a plurality of LAN segments, resulting in that it is possible to resolve the ATM address of the client in the different LAN segment.

As described above, the aforesaid virtual network system is provided with the ATM address resolution server having the ATM addresses corresponding to the addresses used in the upper level protocol higher than the network layer of the client in a plurality of LAN segments, and in the case that the receiver is present in the LAN segment differing from that of the transmitter, the ATM address of the receiver is resolved by the aforesaid ATM address resolution server, resulting in that the entire ATM network including a plurality of LAN segments is treated virtually as if it is one network to enable the data communication to be performed between the different LAN segments without passing the router and so it is possible to prevent a delay generated by the reading-out operation of the packet at the router.

As described above, in accordance with the aforesaid virtual network system, the ATM address of the receiver is resolved by the ATM address resolution server in the case that the receiver of the packet is present in the LAN segment differing from the transmitter and the trasmitting and the receiving of the ATM cell are carried out without passing through the router, resulting in that it is possible to perform an efficient data communication between the different LAN segments.

The above and other objects and new features of the present invention will become apparent from the description of the specification and the accompanying drawings.

BRIEF DESCRIPTION OF THE DRAWINGS

Referring now to the accompanying drawings, a preferred embodiment of the present invention will be described in detail as follows.

DETAILED DESCRIPTION OF THE PREFERRED EMBODIMENTS

Figures 1, 2:
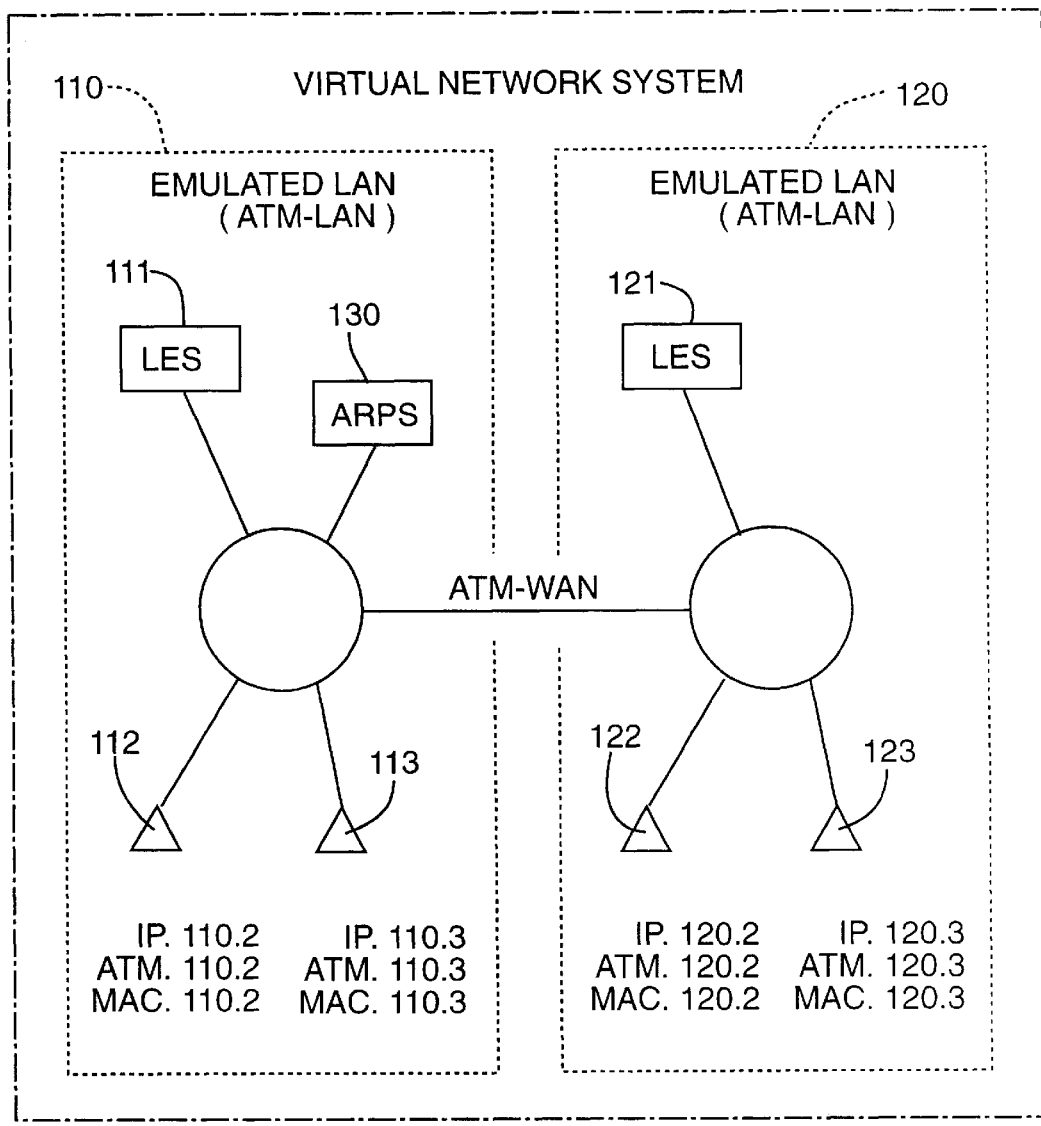
FIG. 1 shows a schematic configuration of a virtual network system of the preferred embodiment.
FIG. 2 shows a content of the address administration table of a LAN emulation server of the virtual network system of the preferred embodiment.

Referring now to the drawings, a preferred embodiment of the present invention will be described in detail as follows.

The virtual network system of the preferred embodiment for performing an efficient data communication between a plurality of emulated LANs in the virtual network system of the present invention will be described as follows.

FIG. 1 shows a schematic configuration of the virtual network system of the preferred embodiment. As shown in FIG. 1, the virtual network system of the present preferred embodiment is comprised of an emulated LAN 110 and an emulated LAN 120, connected by an ATM-WAN (Wide Area Network) to each other. The ATM-WAN are composed of a,public circuit network or the like utilizing ATM. Furthermore, the emulated LAN 110 comprises a LAN emulation server 111, a LAN emulation clients 112, 113 and ATM address resolution server 130, and the emulated LAN 120 comprises a LAN emulation clients 122, 123 and an LAN emulation server 121.

The LAN emulation server 111, the LAN emulation client 112 and the LAN emulation client 113 in the emulated LAN 110 are connected by one or a plurality of ATM switches so as to constitute a virtual LAN which is a virtual LAN segment for emulating the MAC protocol used in the existing LAN.

In addition, the LAN emulation server 121, the LAN emulation client 122 and the LAN emulation client 123 in the emulated LAN 120 are connected by one or a plurality of ATM switches so as to constitute another virtual LAN which is a virtual LAN segment for emulating the MAC protocol used in the existing LAN.

The aforesaid virtual LAN segment used herein is defined to indicate a range in which the broadcasting packet is transmitted when the broadcasting is carried out and further this is a LAN segment which is not restricted by physical limitations such as a connection to the same communication cable and the like.

The LAN emulation server 111 is a server for resolving an ATM address from a MAC address of the client in the emulated LAN 110 and this server has an address administration table (LES address administration table) where ATM addresses corresponding to MAC addresses of the LAN emulation clients 112, 113 are stored.

In addition, the LAN emulation server 121 is a server for resolving an ATM address from a MAC address of the client in the emulated LAN 120 and this server has an address administration table (LES address administration table) where ATM addresses corresponding to MAC addresses of the LAN emulation clients 122, 123 are stored.

The ATM address resolution server 130 is a server for resolving the ATM address from IP addresses in the emulated LAN 110 and the emulated LAN 120 and this server has an address administration table (ARS address administration table) where ATM addresses corresponding to IP addresses of the LAN emulation clients 112, 113, 122 and 123.

Each of the LAN emulation clients 112, 113, 122 and 123 may be either a personal computer, a work station or a host computer directly connected to an ATM switch, or a router or a LAN switch for connecting an ATM switch and an existing LAN such as Ethernet or the like connecting a plurality of computers.

Each of the LAN emulation clients 112 and 113 constituting the emulated LAN 110 is assigned with specific addresses; the LAN emulation client 112 is assigned with "IP.110.2" as the IP address, "ATM.110.2" as the ATM address and "MAC.110.2" as the MAC address, respectively; and the LAN emulation client 113 is assigned with "IP.110.3" as the IP address, "ATM.110.3" as the ATM address and "MAC.110.3" as the MAC address, respectively.

In the same manner as described above, the LAN emulation clients 122 constituting the emulated LAN 110 is assigned with "IP.120.2" as the IP address, "ATM.120.2" as the ATM address and "MAC.120.2" as the MAC address, the LAN emulation clients 123 is assigned with "IP.120.3" as the IP address, "ATM.120.3" as the ATM address and "MAC.120.3" as the MAC address, respectively.

FIG. 2 shows the content of the LES address administration table of the LAN emulation server 111. As shown in FIG. 2, each entry of the LES address administration table of the LAN emulation server 111 has the MAC address 201 and the ATM address 202. The LES address administration table of the LAN emulation server 111 indicates that the ATM address 202 of the client with the MAC address 201 being "MAC.110.2" is "ATM.110.2" and the ATM address of the client with the MAC address 201 being "MAC.110.3" is "ATM.110.3", respectively.

Figure 3:
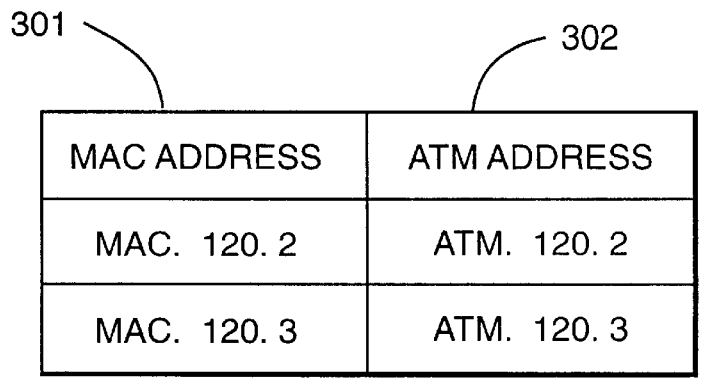
FIG. 3 shows the content of the address administration table of the LAN emulation server of the virtual network system of the preferred embodiment.

FIG. 3 Shows the content of the LES address administration table of the LAN emulation server 121. In the same manner as described above, the LES address administration table of the LAN emulation server 121 indicates that the ATM address 302 of the client with the MAC address 301 being "MAC.120.2" and the ATM address 302 of the client with the MAC address 301 being "MAC.120.3" is "ATM.120.3", respectively.

Figure 4:
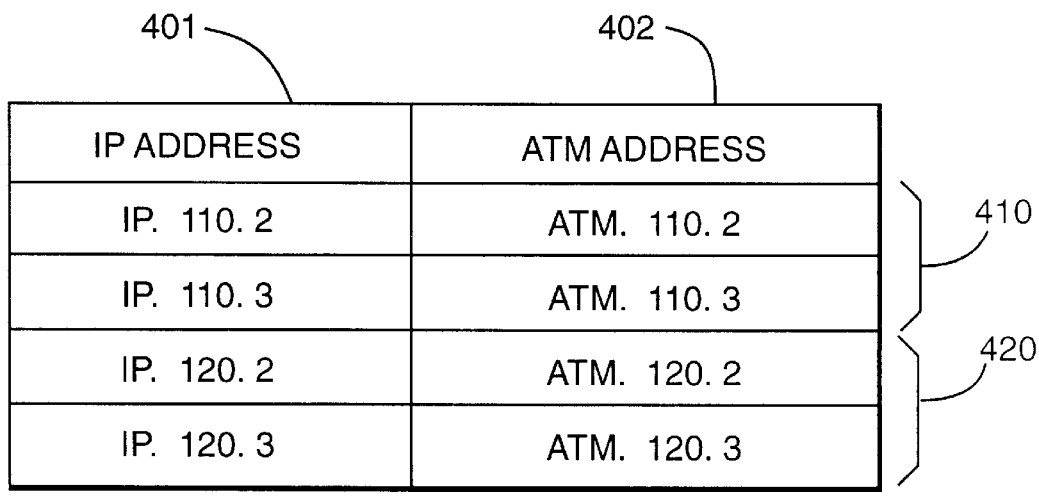
FIG. 4 shows the content of the ARS address administration table of the ATM address resolution server of the virtual network system of the preferred embodiment.

FIG. 4 shows the content of the ARS address administration table of the ATM address resolution server 130. As shown in FIG. 4, each entry of the ARS address administration table of the ATM address resolution server 130 has an IP address 401 and an ATM address 402. The ARS address administration table of the ATM address resolution server 130 includes address administration data 410 comprising entries related to the clients within the emulated LAN 110 and address administration data 420 comprising entries related to the clients within the emulated LAN 120.

In addition, as shown in FIG. 4, the ARS address administration table in the ATM address resolution server 130 indicates that the ATM address 402 of the client with the IP address 401 being "IP.110.2" is "ATM.110.2"; the ATM address 402 of the client with the IP address 401 being "IP.110.3" is "ATM.110.3"; the ATM address 402 of the client with the IP address 401 being "IP.120.2" is "ATM.120.2"; and the ATM address 402 of the client with the IP address 401 being "IP.120.3" is "ATM.120.3", respectively.

As described above, the ARS address administration table of the ATM address resolution server 130 holds the IP address 401 and the ATM address 402 of each of the LAN emulation clients 112, 113, 122 and 123 in a plurality of emulated LANs 110 and 120 in the same manner.

Figure 5:
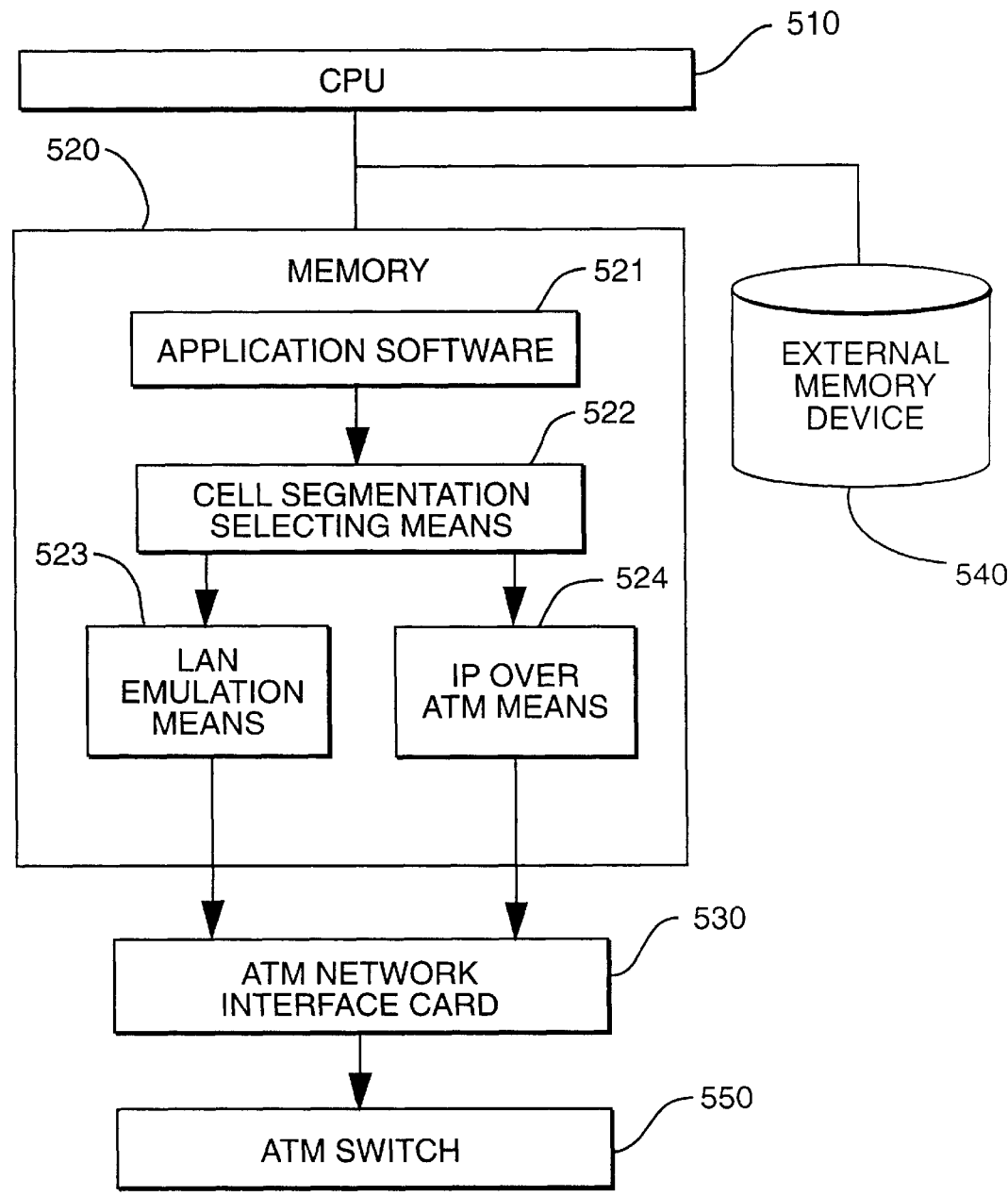
FIG. 5 shows a schematic configuration of each LAN emulation client of the virtual network system of the preferred embodiment.

FIG. 5 shows a schematic constitution of each of the LAN emulation clients 112, 113, 122 and 123. As shown in FIG. 5, each of the LAN emulation clients 112, 113, 122 and 123 comprises a CPU 510, a memory 520, an ATM network interface card 530 and an external memory device 540. The memory 520 includes an application software 521, a cell segmentation selecting means 522, a LAN emulation means 523, and an IP-over-ATM means 524. The ATM network interface card is connected to an ATM switch 550.

In the present embodiment, the cell segmentation selecting means 522, the LAN emulation means 523, and the IP-over-ATM means 524 are performed by software programs. However, these means may be performed by hardware such as an adapter card, an LSI chip or the like. Furthermore, the ATM network interface card 530 may be replaced by an ATM network interface LSI chip or the like.

At the LAN emulation clients 112, 113, 122 and 123, either a LAN emulation or an IP-over-ATM, which is the native-mode ATM for an IP packet, is carried out in response to the IP address of the receiver indicated by the IP packet produced by the application software 521 performing a data communication.

The cell segmentation selecting means 522 selects either the LAN emulation or an IP-over-ATM is to be performed in reference to the IP address of the receiver stored in the IP packet made by the application software 521.

The LAN emulation means 523 is a means for getting an ATM address of the receiver from the MAC address of the receiver after making the MAC frame by adding information such as MAC address or the like to the IP packet in the case that an operation of the LAN emulation is selected by the cell segmentation selecting means 522 and then making an ATM cell from the aforesaid MAC frame.

The IP-over-ATM means 524 is a means for getting the ATM address of the receiver from the IP address of the receiver and making the ATM cell from the aforesaid IP packet in the case that an operation of the IP-over-ATM is selected by the cell segmentation selecting means 522.

The ATM network interface card 530 is an interface card for transmitting a plurality of ATM cells made by either the LAN emulation means 523 or the IP-over-ATM means 524 to the ATM switch 550.

Figure 6:
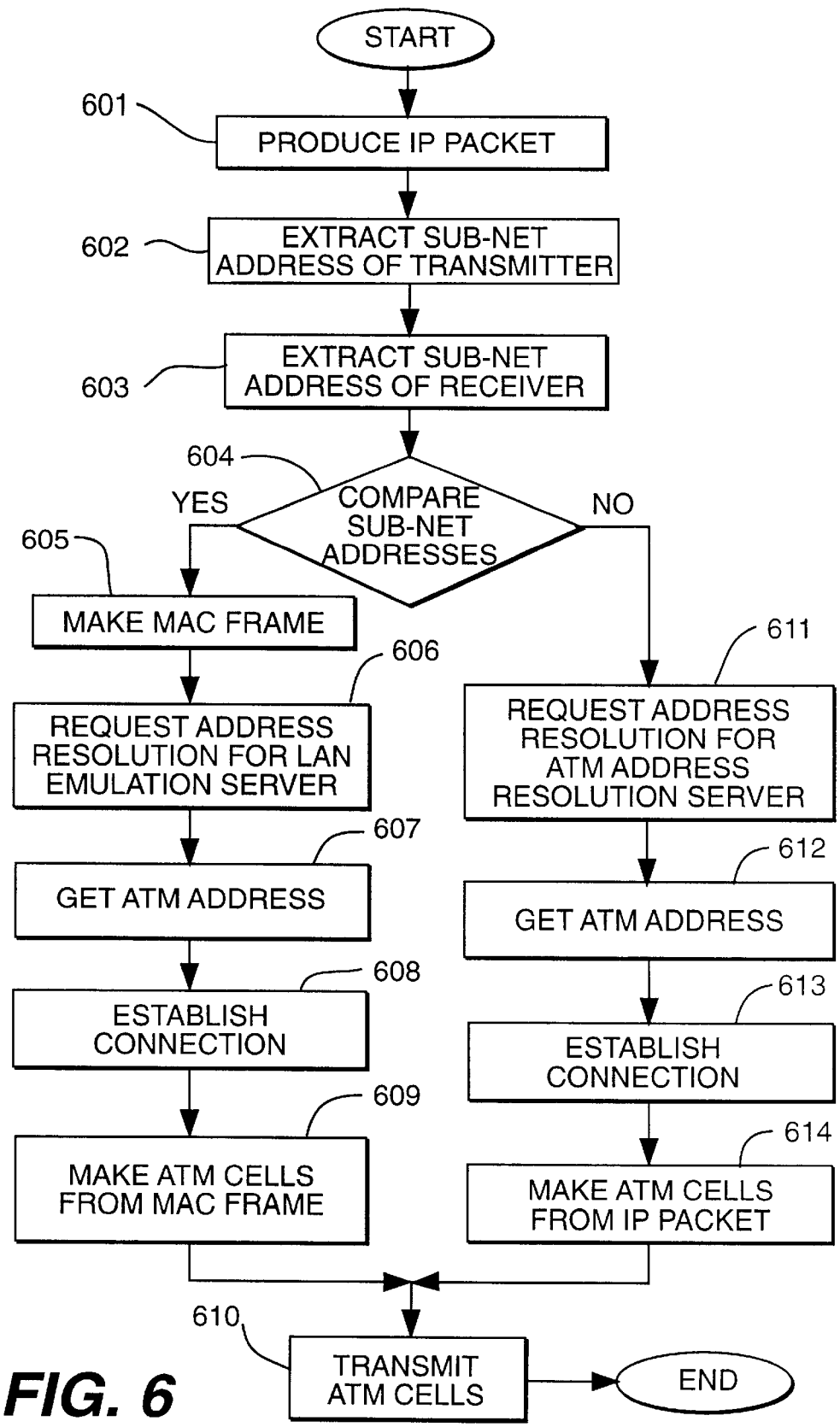
FIG. 6 is a flow chart for showing a processing procedure of the IP packet transmitting processing of the virtual network system of the preferred embodiment.

FIG. 6 is a flow chart indicating a procedure of the IP packet transmitting processing.

A processing procedure for transmitting the IP packet to the LAN emulation client 123 in the emulated LAN 120 by the LAN emulation client 122 in the emulated LAN 120 will be described as follows.

As shown in FIG. 6, the LAN emulation client 122 in the emulated LAN 120 adds header information such as the IP address "IP.120.2" of the LAN emulation client 122 as the transmitter and the IP address "IP.120.3" of the LAN emulation client 123 as the receiver to data to be transmitted so as to make the IP packet (step 601).

At the processing of a step 602, the cell segmentation selecting means 522 of the LAN emulation client 122 reads out the transmitter's IP address "IP.120.2" in the IP packet made by the processing at the step 601 and performs a logical AND operation to specific bits of an upper level part of the IP address so as to extract the sub-net address "IP.120" of the LAN emulation client 122 of the transmitter.

At the processing of a step 603, the cell segmentation selecting means 522 of the LAN emulation client 122 reads out the receiver's IP address "IP.120.3" in the IP packet made by the processing at the step 601 and performs logical AND operation to specific bits of an upper level part of the IP address so as to extract the sub-net address "IP.120" of the LAN emulation client 123 of the receiver.

At the processing of a step 604, the cell segmentation selecting means 522 of the LAN emulation client 122 compares the sub-net address "IP.120" of the LAN emulation client 122 (transmitter) with the sub-net address "IP.120" of the LAN emulation client 123 (receiver).

The LAN emulation client 122 (transmitter) and the LAN emulation client 123 (receiver) are connected to the same emulation LAN 120 and the two sub-net addresses are equal to each other, so that the processing proceeds to a step 605 to perform the LAN emulation.

At the processing of a step 605, the LAN emulation means 523 of the LAN emulation client 122 resolves the MAC address of the LAN emulation client 123 of the receiver and gets the MAC address "MAC.120.3" of the receiver, thereafter adds header information such as the got MAC address "MAC.120.3" of the receiver to the IP packet so as to make the MAC frame. Then, at the processing of a step 606, the LAN emulation means 523 of the LAN emulation client 122 resolves the ATM address of the LAN emulation client 123 of the receiver by using the got MAC address "MAC.120.3" of receiver. That is, the LAN emulation means 523 of the LAN emulation client 122 makes an address resolution request with the MAC address "MAC.120.3" of the receiver to the LAN emulation server 121. The LAN emulation client 122 has got the ATM address of the LAN emulation server 121 by a suitable procedure to establish a connection with the LAN emulation server 121 before the issuance of the request. The procedure may be executed for another address resolution request issued before, accompanied with storing the ATM address of the LAN emulation server 121 in the LAN emulation client 122. Alternatively, the procedure may be executed by an initialization process of the client 122 or the LAN emulation server 121, or by occasional communications with the LAN emulation server 121.

The LAN emulation server 121 having received the address resolution request from the LAN emulation client 122 refers to the LES address administration table shown in FIG. 3 to get the ATM address 302 corresponding to the MAC address 301 being "MAC.120.3" and reads out the ATM address "ATM.120.3" of the receiver. Then, the LAN emulation server 121 transmits the ATM address "ATM.120.3" of the receiver to the LAN emulation client 122 as the address resolution reply. The LAN emulation client 122 receives the address resolution reply from the LAN emulation server 121 and gets the ATM address "ATM.120.3" of the LAN emulation client 123 of the receiver (step 607).

Then, at the processing of a step 608, the LAN emulation client 122 establishes a connection with the LAN emulation client 123 of the receiver, using the ATM address "ATM.120.3" of the LAN emulation client 123.

Then, the LAN emulation means 523 of the LAN emulation client 122 makes ATM cells from the MAC frame made at the step 605 (step 609), and transmits the ATM cells through the ATM network interface card 530 to the ATM switch 550 (step 610).

As described above, in the case of the data communication between the LAN emulation clients 122 and 123 within the emulated LAN 120 having the same sub-net address, the LAN emulation is carried out, so that it is possible to use a BUS (Broadcast and Unknown Server) provided in the prior art LAN emulation when either the broadcasting or the multi-casting is wanted to be carried out.

A processing procedure in which the LAN emulation client 112 in the emulated LAN 110 transmits the IP packet to the LAN emulation client 123 in the emulated LAN 120 will be described as follows.

At the step 601 as shown in FIG. 6, the application software 521 of the LAN emulation client 112 adds header information such as the IP address "IP.110.2" of the LAN emulation client 112 as the transmitter and the IP address "IP.120.3" of the LAN emulation client 123 as the receiver to data to be transmitted, and makes an IP packet.

At the processing of the step 602, the cell segmentation selecting means 522 of the LAN emulation client 112 reads out the IP address "IP.110.2" of the transmitter of the IP packet made at the step 601 and performs a logical AND operation to the specified bits of the upper level portion of the IP address, thereby extracts the sub-net address "IP.110" of the LAN emulation client 112 of the transmitter.

At the step 603, the cell segmentation selecting means 522 of the LAN emulation client 112 reads out the IP address "IP.120.3" of the receiver of the IP packet made at the step 601 in the same manner as described above, performs a logical AND operation for the specified bits of the upper level portion of the IP address and extracts the sub-net address "IP.120" of the LAN emulation client 123 of the receiver.

Then, the cell segmentation selecting means 522 of the LAN emulation client 112 compares the sub-net address "IP.110" of the LAN emulation client 112 with the sub-net address "IP.120" of the LAN emulation client 123 (step 604).

Because the LAN emulation client 112 is connected to the emulated LAN 110 and the LAN emulation client 123 of the receiver is connected to the emulated LAN 120, the aforesaid two sub-net addresses are not equal to each other. As the result of the comparison at the step 604, the processing proceeds to the step 611 so as to perform the processing of IP-over-ATM.

At first, at a step 611, the IP-over-ATM means 524 of the LAN emulation client 112 makes an address resolution request with the IP address "IP.120.3" to the ATM address resolution server 130 so as to resolve the ATM address of the LAN emulation client 123 of the receiver. The LAN emulation client 112 has got the ATM address of the ATM address resolution server 130 by a suitable procedure to establish a connection with the LAN emulation server 121 before the issuance of the request. In the present embodiment, the procedure is executed at an initialization process of the client 112 or the ATM address resolution server 130. Alternatively, the procedure may be executed for the address resolution request or another address resolution request issued before, accompanied with storing the ATM address of the ATM address resolution server 130 in the LAN emulation client 112, or may be executed at occasional communications with the ATM address resolution server 130.

The ATM address resolution server 130 having received the address resolution request from the LAN emulation client 112 refers to the ARS address administration table shown in FIG. 4 to get the ATM address 402 corresponding to the IP address 401 being "IP.120.3" and reads out the ATM address "ATM.120.3" of the receiver. Then, the ATM address resolution server 130 transmits the ATM address "ATM.120.3" of the receiver to the LAN emulation client 112 as the address resolution reply. The LAN emulation client 112 receives the address resolution reply from the ATM address resolution server 130 and gets the ATM address "ATM.120.3" of the LAN emulation client 123 of the receiver (step 612).

At the processing of a step 613, the LAN emulation client 112 establishes a connection with the LAN emulation client 123 of the receiver, using the ATM address "ATM.120.3" of the LAN emulation client 123.

Then, the IP-over-ATM means 524 of the LAN emulation client 112 makes ATM cells from the IP packet made at the step 601 (step 614), and transmits the ATM cells through the ATM network interface card 530 to the ATM switch 550 (step 610).

In both the LAN emulation mode and the IP-over ATM, LAN emulation client 123 assembles the received ATM cells, determines whether the assembled data is a MAC frame or an IP packet. Furthermore, if the assembled data is a MAC frame, LAN emulation client 123 makes an IP packet from the MAC frame by removing MAC addresses and so on.

As described above, in the case that a data communication is carried out between the LAN emulation client 112 connected in the emulated LAN 110 and the LAN emulation client 123 connected in the emulated LAN 120, where a sub-net address of the emulated LANs 120 is different from a sub-net address of the emulated LAN 110, the ATM address resolution server 130 serves to resolve the ATM address corresponding to the IP address of each of a plurality of clients connected in a plurality of emulated LANs 110 and 120, so that it is possible to perform a data communication between the different emulated LANs without passing through the ATM router.

Accordingly, the ATM cells are transmitted or received without passing through the ATM router when a data communication is performed between the different emulated LANs 110 and 120, so that it is possible to perform a data communication without producing any delay when the IP packet is read out at the ATM router.

As described above, in the present embodiment, the cell segmentation selecting means 522 extracts the sub-net addresses from the IP addresses of the transmitter and the receiver, and compares these sub-net addresses to each other to select whether or not it uses the ATM address resolution server 130. However, this processing may be carried out as follows.

That is, each client provides an LAN segment address administration table in which IP addresses of clients belonging to the same LAN segment as that of the client are stored and in the case that the IP address of the receiver is not present in the LAN segment address administration table, the ATM address resolution server 130 is used for resolving the ATM address of the receiver.

In the prior art ATM network, it is possible to construct a virtual LAN segment without having any relation with a value of the IP address, by grouping clients having arbitrary IP addresses. In the present invention, it is also possible to construct a virtual LAN segment without having any relation with a value of the IP address, by using the LAN segment address administration table, because a LAN emulation client of a transmitter can decide whether or not a LAN emulation client of a receiver is within the same LAN segment on the basis of the IP address of the receiver client.

In the virtual network system of the present invention, it may be selected whether or not the ATM address resolution server is applied by checking a mode selection flag provided in the IP packet. That is, the application software performing the data communication sets the mode selection flag, the cell segmentation selecting means 522 checks a value of the mode selection flag for the selection.

As described above, in accordance with the virtual network system of the present preferred embodiment, the cell segmentation selecting means selects either of the LAN emulation means or the native-mode ATM means, and the selected means makes ATM cells, so that it is possible to perform either the LAN emulation or the native-mode ATM in response to an operation of the application software performing the data communication.

In accordance with the virtual network system of the present preferred embodiment, when the receiver of the packet is present in the LAN segment differing from that of the transmitter, the ATM address of the receiver is resolved by the ATM address resolution server and the transmitting or receiving of the ATM cell is carried out without passing through the router, so that it is possible to perform an efficient data communication between the different LAN segments.

In the virtual network system of the present preferred embodiment, each of the cell segmentation selecting means 522, the LAN emulation means 523, and the IP-over-ATM means 524 are performed by software programs. These programs are installed separately or together from a storage medium such that a floppy disk or a CD-ROM. Alternatively, the programs may be installed by downloading from a computer connected to the LAN emulation client via network.

Furthermore, the virtual network system of the present preferred embodiment has only one ATM address resolution server 130, but the system has a plurality of ATM address resolution servers. In such case, the plurality of ATM address resolution server exchange the contents of their ARS address administration table to coincide the contents.

Although the present invention has already been described practically on the basis of the aforesaid preferred embodiment, it is of course apparent that the present invention is not limited to the aforesaid preferred embodiment, but various modifications can be attained within a scope not excluding its gist.

For example, the IP address is used as the address of the receiver when the address resolution is carried out with the ATM address resolution server, although another address set by the upper level protocol higher than the network layer may be used as an address corresponding to the IP address.

I claim:

1. A client station in a virtual network system comprising a plurality of client stations connected to an ATM network, comprising:

packet means for generating a packet at an upper level protocol layer higher than a data link layer of an OSI 7-layer model;

LAN emulation means for making a MAC frame from a packet made by said packet means and for making ATM cells from said MAC frame to perform LAN emulation communication;

native-mode ATM means for directly making ATM cells from a packet made by said packet means to perform native-mode ATM communication;

cell segmentation selecting means for selecting for each packet made by said packet means, one of LAN emulation communication by using said LAN emulation means and the native-mode ATM communication by using said native-mode ATM means; and ATM communication means for transmitting ATM cells made by either said LAN emulation means or said native-mode ATM means, and receiving ATM cells sent by another client station of said plurality of client stations.

2. A client station according to claim 1, wherein said cell segmentation selecting means makes said selection between the LAN emulation communication and the native-mode ATM communication on the basis of an address of the client station and an address of a receiver client station specified in said packet.

3. A client station according to claim 2, wherein said cell segmentation selecting means compares a predetermined portion of said client station address with a predetermined portion of said receiver client station address to provide a comparison, and makes said selection on the basis of a result of said comparison.

4. A client station according to claim 1, wherein said virtual network system is divided into a plurality of LAN segments, and said cell segmentation selecting means further for determining whether or not said client station and a receiver client station specified in said packet made by said packet means belong to a same LAN segment of said plurality of LAN segments in said selecting between the LAN emulation communication and the native-mode ATM communication.

5. A client station according to claim 4, wherein said cell segmentation selecting means compares a predetermined portion of an address of the client station with a predetermined portion of an address of the receiver client station specified in said packet to provide a comparison, and makes said selection on the basis of a result of said comparison.

6. A client station according to claim 4, further comprising a LAN segment address administrating table in which addresses of client stations of said plurality of client stations belonging to the LAN segment of said client station are stored, wherein said cell segmentation selecting means refers to said LAN segment address administrating table to determine whether or not said transmitter client station and said receiver client station belong to the same LAN segment and compares a predetermined portion of an address of the transmitter client station with a predetermined portion of an address of a receiver client station specified in said packet to provide a comparison, and makes said selection on the basis of a result of said comparison.

7. A client station according to claim 1, wherein said packet means further sets a mode selection flag in said packet, said mode selection flag indicating which one of the LAN emulation communication and the native-mode ATM communication is to be performed, and said cell segmentation selecting means further selects either the LAN emulation communication or the native-mode ATM communication on the basis of said mode selection flag.

8. A client station in a virtual network system comprising a plurality of client stations connected to an ATM network, comprising:

packet means for making an IP packet at a network layer of an OSI 7-layer model;

LAN emulation means for making a MAC frame from an IP packet made by said packet means and for making ATM cells from said MAC frame to perform LAN emulation communication;

IP-over-ATM means for directly making ATM cells from an IP packet made by said packet means to perform IP-over-ATM communication;

cell segmentation selecting means for selecting for each IP packet made by said packet means, either the LAN emulation communication by using said LAN emulation means or the IP-over-ATM communication by using said IP-over-ATM means; and ATM communication means for transmitting ATM cells made by one of said LAN emulation means or said IP-over-ATM means, and receiving ATM cells sent by another client station of said plurality of client stations.

9. A virtual network system comprising an ATM network and a plurality of client stations connected to said ATM network, each of said plurality of client stations comprising:

packet means for making a packet at an upper level protocol layer higher than a data link layer of an OSI 7-layer model;

LAN emulation means for making a MAC frame from a packet made by said packet means and for making ATM cells from said MAC frame to perform LAN emulation communication;

native-mode ATM means for directly making ATM cells from a packet made by said packet means to perform native-mode ATM communication;

cell segmentation selecting means for selecting for each packet made by said packet means, either the LAN emulation communication by using said LAN emulation means or the native-mode ATM communication by using said native-mode ATM means; and ATM communication means for transmitting ATM cells made by either said LAN emulation means or said native-mode ATM means, and receiving ATM cells sent by another client station of said plurality of client stations.

10. A virtual network system according to claim 9, further comprising an ATM address resolution server for resolving in response to an address resolution request from one of said plurality of client stations, an ATM address corresponding to an address specified in said address resolution request, said specified address being used to identify each of said plurality of client stations at said upper level protocol layer, wherein said native-mode ATM means issues an address resolution request with an address at said upper level protocol layer of said receiver client station of a packet, to get an ATM address of the receiver client station of said packet, and specifies said ATM address within each of said ATM cells.

11. A virtual network system according to claim 10, wherein said ATM address resolution server comprises:

address administration table for storing a pair of said upper level protocol layer address and said ATM address corresponding to said upper level protocol layer address for each of said plurality of client stations;

retrieve means for referring to said address administration table to get said ATM address corresponding to said upper level protocol layer address specified in said address resolution request and for reading out said corresponding ATM address; and means for transmitting said corresponding ATM address to said one of said plurality of client stations.

12. A virtual network system according to claim 9, further comprising a LAN emulation server for resolving in response to an address resolution request from one of said plurality of client stations, an ATM address corresponding to a MAC address specified in said address resolution request, wherein said LAN emulation means makes said address resolution request with a MAC address of said receiver client station of said MAC frame to get an ATM address of a receiver client station of said MAC frame, and specifies said ATM address within each of said ATM cells.

13. A virtual network system according to claim 12, wherein said LAN emulation server comprises:

address administration table for storing a pair of said MAC address and said ATM address corresponding to said MAC address for each of said plurality of client stations;

retrieve means for referring to said address administration table to get said ATM address corresponding to MAC address specified in said address resolution request and for reading out said corresponding ATM address; and means for transmitting said corresponding ATM address to said one of said plurality of client stations.

14. A virtual network system according to claim 9, wherein said virtual network system is divided into a plurality of LAN segments, and further comprises:

an ATM address resolution server for resolving in response to an address resolution request of a first type from one of said plurality of client stations, an ATM address corresponding to an address specified in said address resolution request of the first type, said specified address in said address resolution request of the first type being used to identify each of said plurality of client stations at said upper level protocol layer; and a plurality of LAN emulation servers, each of said plurality of LAN emulation servers being provided for each of said plurality of LAN segments, for resolving in response to an address resolution request of second type from one of said plurality of client stations, an ATM address corresponding to a MAC address specified in said address resolution request of second type, wherein said ATM address resolution server provides a first address administration table for storing a pair of said upper level protocol layer address and said ATM address corresponding to said upper level protocol layer address for each of said plurality of client stations, each of said plurality of LAN emulation servers provides a second address administration table for storing a pair of said MAC address and said ATM address corresponding to said MAC address for each of said plurality of client stations within one of said plurality of LAN segments, said one of said plurality of LAN segments corresponding to said each of said plurality of LAN emulation servers, said native-mode ATM means issues an address resolution request of said first type with an address at said upper level protocol layer of said receiver client station of said packet, to get ATM address of the receiver client station of said packet, and specifies said ATM address within each of said ATM cells, and said LAN emulation means issues said address resolution request of second type with a MAC address of said receiver client station of said MAC frame to get an ATM address of the receiver client station of said MAC frame, and specifies said ATM address within each of said ATM cells.

15. A virtual network system according to claim 14, wherein said upper level protocol layer is a network layer and said packet is an IP packet.

16. A communication method in a virtual network system comprising an ATM network and a plurality of client stations connected to said ATM network, comprising of the steps of:

making a packet at an upper level protocol layer higher than a data link layer of an OSI 7-layer model;

selecting for said packet made at said upper level protocol layer, one of LAN emulation communication or native-mode ATM communication;

in response to the selection of the LAN emulation communication, making a MAC frame from said packet and making ATM cells from said MAC frame;

in response to the selection of the native-mode ATM communication, directly making ATM cells from said packet; and transmitting each of said ATM cells made by either said LAN emulation communication or said native-mode ATM communication.

17. A storage medium for storing a LAN emulation control program in a virtual network system comprising an ATM network and a plurality of client stations connected to said ATM network, wherein said virtual network system provides LAN emulation communication and native-mode ATM communication and said LAN emulation control program executes:

selecting for a packet made at an upper level protocol layer higher than a data link layer of an OSI 7-layer model one of said LAN emulation communication or native-mode ATM communication;

in response to the selection of the LAN emulation, makes a MAC frame from said packet and further makes ATM cells from said MAC frame;

in response to the selection of the native-mode ATM, directly makes ATM cells from said packet; and transmits each of said ATM cells made at either said LAN emulation step or said native-mode ATM step.

* * * * *